UNITED STATES PATENT OFFICE.

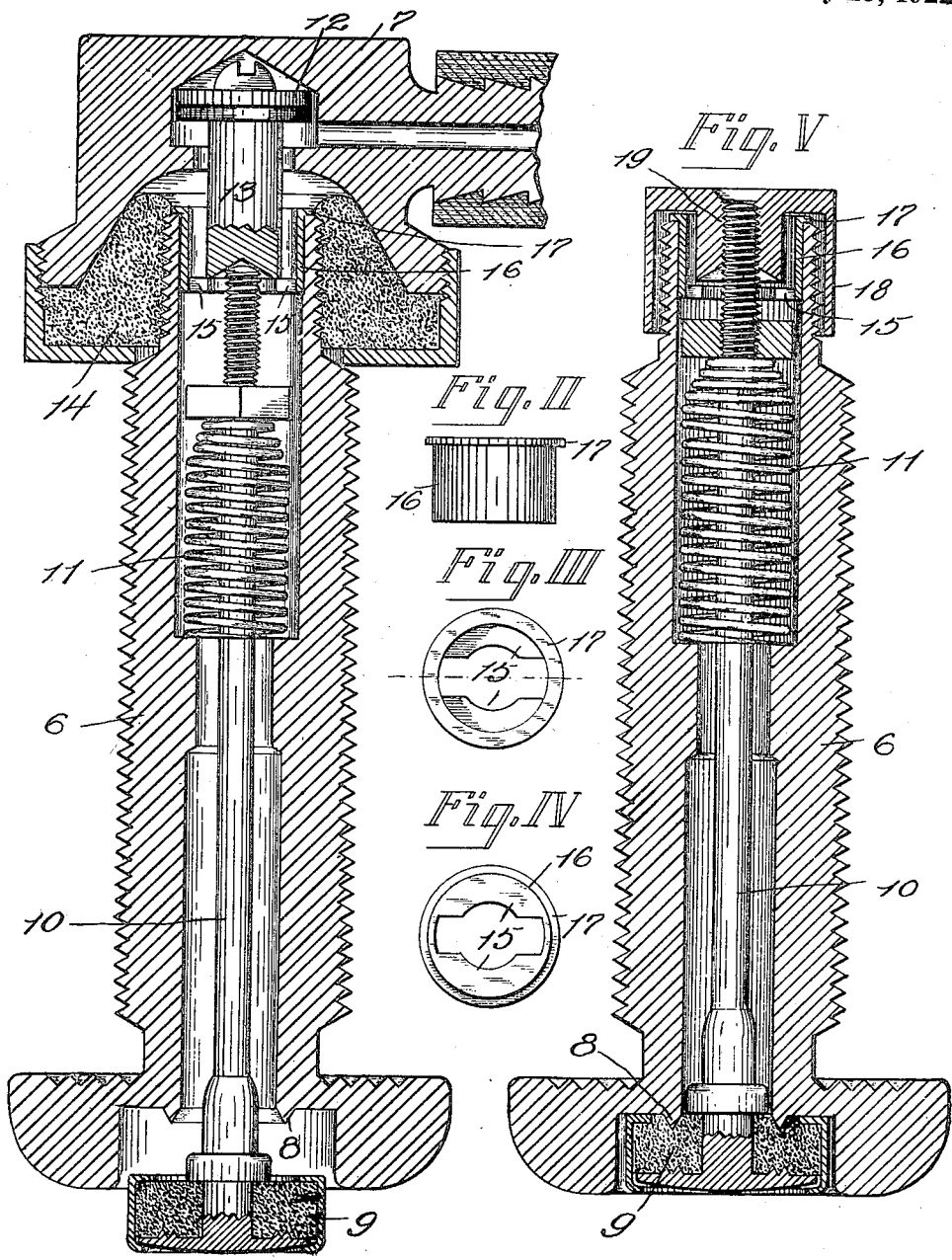

JOSEPH N. NEWSOM AND HARRY E. HARDER, OF ST. LOUIS, MISSOURI, ASSIGNORS TO NEWSOM VALVE COMPANY, OF ST. LOUIS, MISSOURI, A CORPORATION OF MISSOURI.

VALVE DEVICE FOR PNEUMATIC TIRES.

1,423,873.  Specification of Letters Patent.  Patented July 25, 1922.

Application filed February 5, 1920. Serial No. 356,543.

*To all whom it may concern:*

Be it known that we, JOSEPH N. NEWSOM and HARRY E. HARDER, citizens of the United States of America, residents of the city of St. Louis and State of Missouri, have invented certain new and useful Improvements in Valve Devices for Pneumatic Tires, of which the following is a full, clear, and exact description, reference being had to the accompanying drawings, forming a part of this specification.

Our invention relates to improvements in valve devices for pneumatic tires and one of our objects is to provide means of simple and inexpensive construction designed to be within the valve tube to properly relate the valve-stem of any ordinary filling chuck, whereby the mere placing of the chuck automatically and positively opens the valves of the chuck and tire.

Our invention consists in the novel construction, arrangement and combination of elements as set forth hereinafter, definitely pointed out in our claims and illustrated by the accompanying drawing, in which—

Fig. I is a sectional view partly in elevation showing the device of our invention as in use relating the valve-stems of a filling chuck and a tire in filling positions.

Fig. II is an elevation of the valve relating element.

Fig. III is a plan of the valve relating element.

Fig. IV is an inverted plan of the valve relating element, and

Fig. V is a sectional view partly in elevation of a tire valve with means for drawing and holding the valve to fully seated position.

Referring to the drawing by numerals, 6 designates the valve tube of the tire and 7 the filling chuck.

In the tube 6 there is a seat 8 and a valve 9 having a stem 10 actuated by a spring 11. In the chuck we have shown there is a valve 12, which is fluid actuated to seating position and provided with a stem 13 for its unseating.

The chuck is provided with a gasket 14 which acts to seal the tube end upon mere placement thereover.

A fault common to this arrangement of coacting valve stems is that without means for predetermining the valve-stem movements there results obstruction, to the inflowing air, incident to a compression of the spring of the tire valve to a too great sectional area, and a further common fault is that the resistance offered by the spring of the tire valve is not sufficient, at all times, to unseat the chuck valve, against the pressure of the air from its source of compression.

As a corrective for these faults we have positioned in the tube 6 an abutment 15 occupying a position out of the path of the stem 10 of the tire valve, but in the path of the stem 13 of the chuck valve, whereby upon a placement of the chuck over the tire tube the stem 13 will engage and depress the stem 10 to open position and upon reaching the abutment 15, the stem 13 will be positively held and the valve seat of the chuck moved from the valve by a continued movement of the chuck in a direction toward its seating position over the tube end.

The abutment, as shown, comprises a sleeve-body 16, adapted to be forced or driven into the upper end of the tire tube 6, and having at its upper margin an outwardly turned stop-flange 17 which limits and determines its inserted position in the tube. At its lower end, the sleeve-body is provided with the abutment 15, referred to, which is preferably in the form of an integral inturned pair of flanges, such as shown in Figs. III and IV which extend into the path of the stem 13 of the chuck valve, as recited, and which are so related as to not interfere with the stem 10 of the valve of the tire and whose combined areas offer a minimum of obstruction to the flow of air from the chuck to the tire.

If desired the abutment element may be constructed by pressing a cup from a single piece of sheet material including the stop-flange at its top and whose bottom is shaped to form the abutment 15 and a single elongated opening between the abutment elements providing for the extension of the stem 10 and the passage of air therethrough.

In Fig. V the device of our invention is illustrated as employed in connection with a cap 18 having a threaded bore 19 for engagement with the threaded end of the stem 10 of the tire valve to draw and hold the valve to fully seated position relative to the seat.

The simple sleeve 16, with its flanges 15 and 17, may be forced into the standard type of tube 10 now in general use, and a tube 10 equipped with this device is adapted to receive any of the ordinary types of tire-filling chucks. The abutment flanges 15 will limit the motion of a check valve stem 13 so as to positively open the chuck valve when the chuck is forced onto the tube 6. In actual practice, the sleeve 16 must be very small in diameter, but its opening between the flanges 15 must be large enough to permit free movement of valve stem 10 and also large enough to permit the admission of air around the chuck valve stem 13. By forming a single elongated opening between the abutment flanges 15, as shown, the very small device can be easily manufactured to provide the desired abutments 15 and at the same time permit the admission of air around the valve stem 13.

We claim:

1. In a device for filling pneumatic tires an element comprising an abutment adapted to fit into the housing of the tire valve for engagement with the stem of a chuck valve to positively open the chuck valve and to limit the depression of the stem of the tire valve.

2. A tire valve device comprising a housing, a valve having a stem in said housing, said stem being adapted to be engaged by a valve opening device, and an abutment in said housing surrounding said stem to limit the movement of the valve opening device.

3. A tire valve device comprising a housing, a valve having a stem in said housing, said stem being adapted to be engaged by a valve opening device, and an abutment in said housing surrounding said stem to limit the movement of the valve opening device, said abutment comprising a sleeve arranged within said housing and having a single opening through which said stem passes, and said opening being large enough to permit the admission of air around said stem.

4. A tire valve device comprising an air conducting tube, a check valve in said tube, a valve operating stem secured to said valve and extending to a point near the outer end of said tube, and an abutment sleeve fitted into said tube near the outer end thereof, said abutment sleeve having an inturned abutment flange at its inner end surrounding said stem and adapted to be engaged by the valve stem of a tire-filling chuck, said inner end of the abutment sleeve having a single opening large enough to permit the admission of air around said stems.

In testimony that we claim the foregoing we hereunto affix our signatures.

JOSEPH N. NEWSOM.
HARRY E. HARDER.